US009860528B2

(12) United States Patent
Chuang et al.

(10) Patent No.: US 9,860,528 B2
(45) Date of Patent: Jan. 2, 2018

(54) METHOD AND APPARATUS OF SCALABLE VIDEO CODING

(75) Inventors: Tzu-Der Chuang, Hsinchu (TW);
Ching-Yeh Chen, Taipei (TW);
Chih-Ming Fu, Hsinchu (TW);
Yu-Wen Huang, Taipei (TW);
Shaw-Min Lei, Hsinchu (TW)

(73) Assignee: HFI INNOVATION INC., Zhubei, Hsinshu County (TW)

( * ) Notice: Subject to any disclaimer, the term of this patent is extended or adjusted under 35 U.S.C. 154(b) by 1074 days.

(21) Appl. No.: 14/005,555

(22) PCT Filed: May 31, 2012

(86) PCT No.: PCT/CN2012/076316
§ 371 (c)(1),
(2), (4) Date: Sep. 17, 2013

(87) PCT Pub. No.: WO2012/167711
PCT Pub. Date: Dec. 13, 2012

(65) Prior Publication Data
US 2014/0003495 A1    Jan. 2, 2014

Related U.S. Application Data

(60) Provisional application No. 61/495,740, filed on Jun. 10, 2011, provisional application No. 61/567,774, filed on Dec. 7, 2011.

(51) Int. Cl.
*H04N 7/12*        (2006.01)
*H04N 19/107*      (2014.01)
(Continued)

(52) U.S. Cl.
CPC ....... *H04N 19/0003* (2013.01); *H04N 19/119* (2014.11); *H04N 19/33* (2014.11);
(Continued)

(58) Field of Classification Search
None
See application file for complete search history.

(56) References Cited

U.S. PATENT DOCUMENTS

2005/0157794 A1    7/2005  Kim et al.
2006/0018381 A1    1/2006  Luo et al.
(Continued)

FOREIGN PATENT DOCUMENTS

CN    101167364 A    4/2008
CN    101888553 A    11/2010
(Continued)

OTHER PUBLICATIONS

Lan, C.D., et al.; "A Multi-domain Motion Vectors Prediction Method for Spatial Scalability;" International Conference on Computer Science and Software Engineering; 2008; pp. 1371-1374.
(Continued)

*Primary Examiner* — James M Anderson, II
(74) *Attorney, Agent, or Firm* — Oblon, McClelland, Maier & Neustadt, L.L.P.

(57) ABSTRACT

A method and apparatus for scalable video coding are disclosed, wherein the video data is configured into a Base Layer (BL) and an Enhancement Layer (EL) and wherein the EL has higher spatial resolution or better video quality than the BL. According to embodiments of the present invention, information from the base layer is exploited for coding the enhancement layer. The information coding for the enhancement layer includes CU structure, motion vector predictor (MVP) information, MVP/merge candidates, intra prediction mode, residual quadtree information, texture information, residual information, context adaptive entropy coding, Adaptive Lop Filter (ALF), Sample Adaptive Offset (SAO), and deblocking filter.

8 Claims, 7 Drawing Sheets

(51) Int. Cl.

| | |
|---|---|
| *H04N 19/52* | (2014.01) |
| *H04N 19/119* | (2014.01) |
| *H04N 19/463* | (2014.01) |
| *H04N 19/33* | (2014.01) |
| *H04N 19/51* | (2014.01) |
| *H04N 19/30* | (2014.01) |
| *H04N 19/517* | (2014.01) |

(52) U.S. Cl.
CPC .......... *H04N 19/463* (2014.11); *H04N 19/51* (2014.11); *H04N 19/52* (2014.11); *H04N 19/30* (2014.11); *H04N 19/517* (2014.11)

(56) References Cited

U.S. PATENT DOCUMENTS

| | | | |
|---|---|---|---|
| 2006/0083309 A1* | 4/2006 | Schwarz | H04N 19/0003 375/240.16 |
| 2007/0171969 A1 | 7/2007 | Han et al. | |
| 2009/0060050 A1 | 3/2009 | Park et al. | |
| 2009/0067502 A1 | 3/2009 | Jeon et al. | |
| 2011/0085593 A1 | 4/2011 | Wang et al. | |
| 2012/0269270 A1* | 10/2012 | Chen | H04N 19/597 375/240.16 |
| 2013/0222539 A1* | 8/2013 | Pahalawatta | H04N 13/0048 348/43 |

FOREIGN PATENT DOCUMENTS

| | | |
|---|---|---|
| EP | 2 136 336 | 12/2009 |
| RU | 2355126 | 5/2009 |
| WO | WO 2010/039728 | 4/2010 |

OTHER PUBLICATIONS

Lange, R.; "Extended Inter-Layer Motion Vectors Prediction in Scalable Video Coding-Case Study and Improvement Proposal;" Joint Video Team (JVT) of ISO/IEC MPEG and ITU-T VCEG (ISO/IEC JTC1/SC29/WG11 and ITU-T SG16 Q.6); Jan. 2006; pp. 1-20.

McCann, K., et al.; "HM3: High Efficiency Video Coding (HEVC) Test Model 3 Encoder Description;" Joint Collaborative Team on Video Coding (JCT-VC) of ITU-T SG16 WP3 and ISO/IEC JTC1/SC29/WH11; Mar. 2011; pp. 1-34.

Francois, E., et al.; "Robust Solution for the AMVP Parsing Issue;" Joint Collaborative Team on Video Coding (JCT-VC) of ITU-T SG16 WP3 and ISO/IEC JTC1/SC29/WH11; Mar. 2011; pp. 1-7.

Reichel, J., et al.; "Joint Scalable Video Model JSVM-4;" Joint Video Team (JVT) of ISO/IEC MPEG and ITU-T VCEG (ISO/IEC JTC1/SC29/WG11 and ITU-T SG16 Q.6); Oct. 2005; pp. 1-41.

Hong, D., et al.; "Scalability Support in HEVC;" Joint Collaborative Team on Video Coding (JCT-VC) of ITU-T SG16 WP3 and ISO/IEC JTC1/SC29/WH11; Jul. 2011; pp. 1-12.

Boyce, J., et al.; "Information for HEVC Scalability Extension;" Joint Collaborative Team on Video Coding (JCT-VC) of ITU-T SG16 WP3 and ISO/IEC JTC1/SC29/WH11; Nov. 2011; pp. 1-7.

* cited by examiner

METHOD AND APPARATUS OF SCALABLE VIDEO CODING

CROSS REFERENCE TO RELATED APPLICATIONS

The present invention claims priority to U.S. Provisional Patent Application Ser. No. 61/495,740, filed Jun. 10, 2011, entitled "Scalable Coding of High Efficiency Video Coding" and U.S. Provisional Patent Application Ser. No. 61/567,774, filed Dec. 7, 2011. The U.S. Provisional Patent Application is hereby incorporated by reference in its entirety.

TECHNICAL FIELD

The present invention relates to video coding. In particular, the present invention relates to scalable video coding that utilizes information of the base layer for enhancement layer coding,

BACKGROUND

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirement are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that video at different spatial-temporal resolution and/or quality can be derived from the same compressed bitstream.

In the current H.264/AVC video standard, there is an extension of the H.264/AVC standard, named Scalable Video Coding (SVC). SVC provides temporal, spatial, and quality scalabilities based on a single bitstream. The SVC bitstream contains scalable video information from low frame-rate, low resolution, and low quality to high frame rate, high definition, and high quality respectively. Accordingly, SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality.

For example, temporal scalability can be derived from hierarchical coding structure based on B-pictures according to the H.264/AVC standard. FIG. 1 illustrates an example of hierarchical B-picture structure with 4 temporal layers and the Group of Pictures (GOP) with eight pictures. Pictures 0 and 8 in FIG. 1 are called key pictures. Inter prediction of key pictures only uses previous key pictures as references. Other pictures between two key pictures are predicted hierarchically. Video having only the key pictures forms the coarsest temporal resolution of the scalable system. Temporal scalability is achieved by progressively refining a lower-level (coarser) video by adding more B pictures corresponding to enhancement layers of the scalable system. In the example of FIG. 1, picture 4 is first bi-directional predicted using key pictures, i.e., pictures 0 and 8 after the two key pictures are coded. After picture 4 is processed, pictures 2 and 6 are processed. Picture 2 is bi-directional predicted using picture 0 and 4, and picture 6 is bi-directional predicted using picture 4 and 8. After pictures 2 and 6 are coded, remaining pictures, i.e., pictures 1, 3, 5 and 7 are processed bi-directionally using two respective neighboring pictures as shown in FIG. 1. Accordingly, the processing order for the GOP is 0, 8, 4, 2, 6, 1, 3, 5, and 7. The pictures processed according to the hierarchical process of FIG. 1 results in hierarchical four-level pictures, where pictures 0 and 8 belong to the first temporal order, picture 4 belongs the second temporal order, pictures 2 and 6 belong to the third temporal order and pictures 1, 3, 5, and 7 belong to the fourth temporal order. By decoding the base level pictures and adding higher temporal order pictures will be able to provide a higher level video. For example, base-level pictures 0 and 8 can be combined with second temporal-order picture 4 to form second-level pictures. By further adding the third temporal-order pictures to the second-level video can form the third-level video. Similarly, by adding the fourth temporal-order pictures to the third-level video can form the fourth-level video. Accordingly, the temporal scalability is achieved. If the original video has a frame rate of 30 frames per second, the base-level video has a frame rate of 30/8=3.75 frames per second. The second-level, third-level and fourth-level video correspond to 7.5, 15, and 30 frames per second. The first temporal-order pictures are also called base-level video or based-level pictures. The second temporal-order pictures through fourth temporal-order pictures are also called enhancement-level video or enhancement-level pictures. In addition to enable temporal scalability, the coding structure of hierarchical B-pictures also improves the coding efficiency over the typical IBBP GOP structure at the cost of increased encoding-decoding delay.

In SVC, spatial scalability is supported based on the pyramid coding scheme as shown in FIG. 2. In a SVC system with spatial scalability, the video sequence is first down-sampled to obtain smaller pictures at different spatial resolutions (layers). For example, picture 210 at the original resolution can be processed by spatial decimation 220 to obtain resolution-reduced picture 211. The resolution-reduced picture 211 can be further processed by spatial decimation 221 to obtain further resolution-reduced picture 212 as shown in FIG. 2. In addition to dyadic spatial resolution, where the spatial resolution is reduced to half in each level, SVC also supports arbitrary resolution ratios, which is called extended spatial scalability (ESS). The SVC system in FIG. 2 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 212 is coded using motion-compensated and intra prediction 230.

The motion-compensated and intra prediction 230 will generate syntax elements as well as coding related information such as motion information for further entropy coding 240. FIG. 2 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 250. The SNR enhancement layer in FIG. 2 may provide multiple quality levels (quality scalability). Each supported resolution layer can be coded by respective single-layer motion-compensated and intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 2, layer-1 pictures 211 can be coded by motion-compensated and intra prediction 231, base layer entropy coding 241 and SNR enhancement layer coding 251. Similarly, layer-2 pictures 210 can be coded by motion-compensated and intra prediction 232, base layer entropy coding 242 and SNR enhancement layer coding 252. The coding efficiency can be improved due to inter-layer coding. Furthermore, the information required to code spatial layer 1 may depend on reconstructed layer 0 (inter-layer prediction). The inter-layer differences are termed as the enhancement layers. The H.264 SVC provides three types of inter-layer prediction tools: inter-layer motion prediction, inter-layer intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock together with the associated reference indexes and motion vectors are derived from the corresponding data of the co-located 8×8 block in the BL. The reference picture index of the BL is directly used in EL. The motion vectors of EL are scaled from the data associated with the BL. Besides, the scaled BL motion vector can be used as an additional motion vector predictor for the EL.

Inter-layer residual prediction uses the up-sampled BL residual information to reduce the information of EL residuals. The co-located residual of BL can be block-wise up-sampled using a bilinear filter and can be used as prediction for the residual of a current macroblock in the EL. The up-sampling of the reference layer residual is done on a transform block basis in order to ensure that no filtering is applied across transform block boundaries.

Similar to inter-layer residual prediction, the inter-layer intra prediction reduces the redundant texture information of the EL. The prediction in the EL is generated by block-wise up-sampling the co-located BL reconstruction signal. In the inter-layer intra prediction up-sampling procedure, 4-tap and 2-tap FIR filters are applied for luma and chroma components, respectively. Different from inter-layer residual prediction, filtering for the inter-layer intra prediction is always performed across sub-block boundaries. For decoding simplicity, inter-layer intra prediction can be restricted to only intra-coded macroblocks in the BL.

In SVC, quality scalability is realized by coding multiple quality ELs which are composed of refinement coefficients. The scalable video bitstream can be easily truncated or extracted to provide different video bitstreams with different video qualities or bitstream sizes. In SVC, the quality scalability, (also called SNR scalability) can be provided via two strategies, coarse grain scalability (CGS), and medium grain scalability (MGS), The CGS can be regarded as a special case of spatial scalability, where the spatial resolution of the BL and the EL are the same. However, the quality of the EL is better (the QP of the EL is smaller than the QP of the BL). The same inter-layer prediction mechanism for spatial scalable coding can be employed. However, no corresponding up-sampling or deblocking operations are performed. Furthermore, the inter-layer intra and residual prediction are directly performed in the transform domain. For the inter-layer prediction in CGS, a refinement of texture information is typically achieved by re-quantizing the residual signal in the EL with a smaller quantization step size than that used for the preceding CGS layer. CGS can provide multiple pre-defined quality points.

To provide finer bit rate granularity while maintaining reasonable complexity for quality scalability, MGS is used by H.264 SVC. MGS can be considered as an extension of CGS, where the quantized coefficients in one CGS slice can be divided into several MGS slices. The quantized coefficients in CGS are classified to 16 categories based on its scan position in the zig-zag scan order. These 16 categories of coefficients can be distributed into different slices to provide more quality extraction points than CGS.

In the current HEVC, it only provides single layer coding based on hierarchical-B coding structure without any spatial scalability and quality scalability. It is desirable to provide the capability of spatial scalability and quality scalability to the current HEVC. Furthermore, it is desirable to provide improved SVC over the H.264 SVC to achieve higher efficiency and/or more flexibility.

SUMMARY

A method and apparatus for scalable video coding that exploits Base Layer (BL) information for Enhancement Layer (EL) are disclosed, where the EL has higher resolution and/or better quality than the BL. Embodiments of the present invention exploit various pieces of the BL information to improve coding efficiency of the EL. In one embodiment according to the present invention, the method and apparatus utilizes CU structure information, mode information, or motion information of the BL to derive respective CU structure information, mode information, or motion vector predictor (MVP) information for the EL. A combination of the CU structure, the mode, and the motion information may also be used to derive the respective information for the EL. In another embodiment according to the present invention, the method and apparatus derives Motion Vector Predictor (MVP) candidates or merge candidates of the EL based on MVP candidates or merge candidates of the BL. In yet another embodiment of the present invention, the method and apparatus derives intra prediction mode of the EL based on intra prediction mode of the BL.

An embodiment of the present invention utilizes Residual Quadtree Structure information of the BL to derive the Residual Quadtree Structure for the EL. Another embodiment of the present invention derives the texture of the EL by re-sampling the texture of the BL. A further embodiment of the present invention derives the predictor of residual of the EL by re-sampling the residual of the BL.

One aspect of the present invention addresses the coding efficiency of context-based adaptive entropy coding for the EL. An embodiment of the present invention determines context information for processing a syntax element of the EL using the information of the BL. Another aspect of the present invention addresses the coding efficiency related in-loop processing. An embodiment of the present invention derives the ALF information, the SAO information, or the DF information for the EL using the ALF information, the SAO information, or the DF information of the BL respectively.

DETAILED DESCRIPTION

Figure 1:
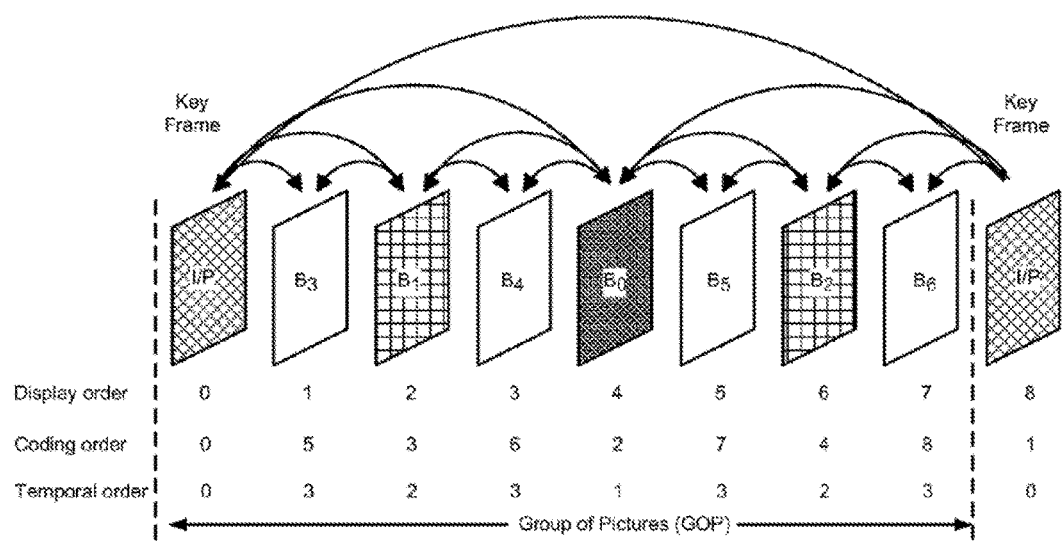
FIG. 1 illustrates an example of temporal scalable video coding using hierarchical B-pictures.
Figure 2:
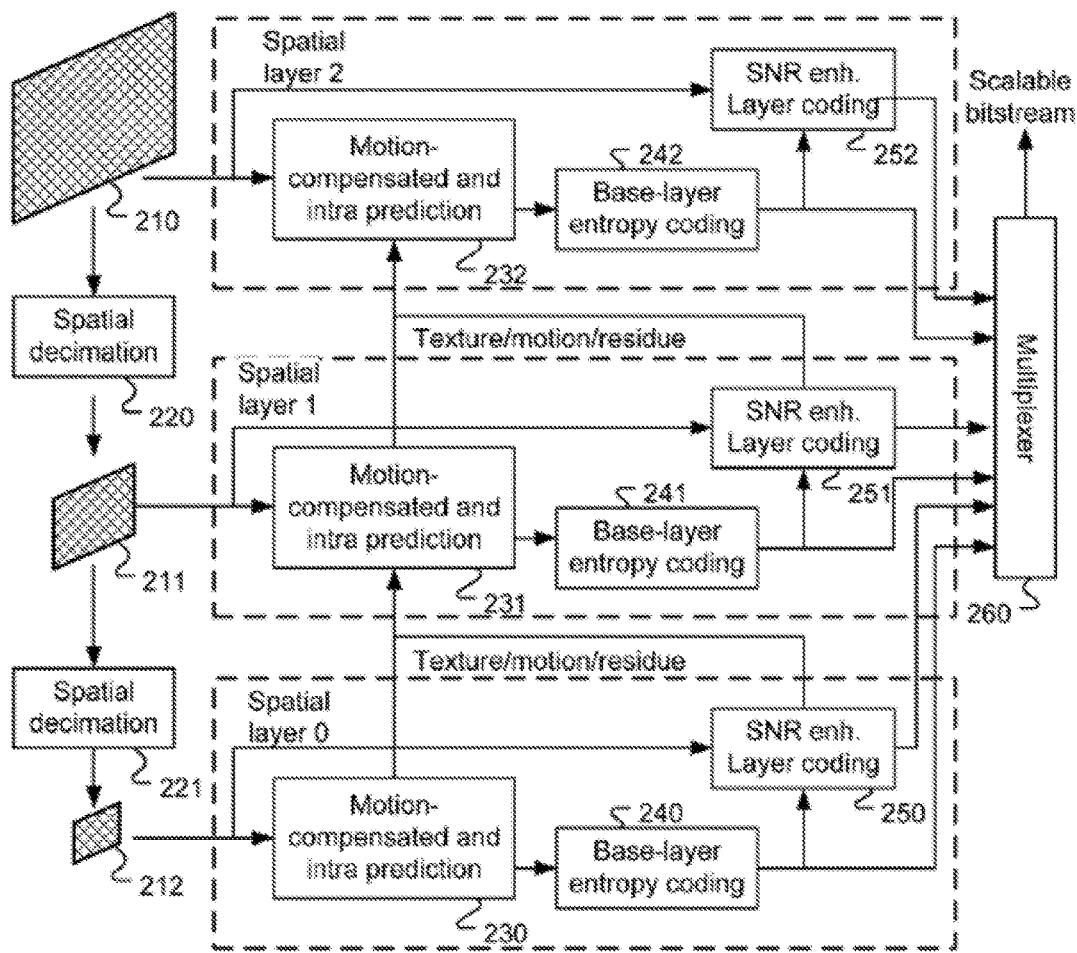
FIG. 2 illustrates an example of a combined scalable video coding system that provides spatial scalability as well as quality scalability where three spatial layers are provides.
Figure 3:
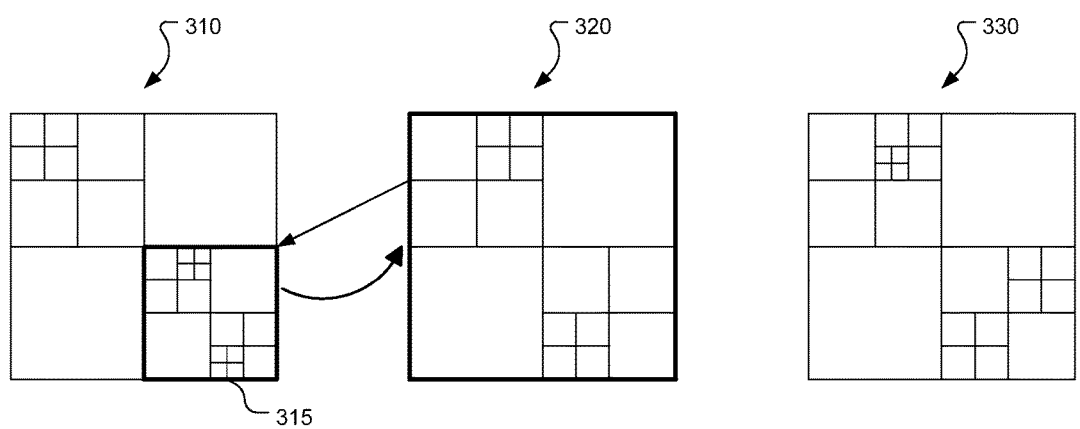
FIG. 3 illustrates an example of CU structure reuse for scalable video coding where a CU structure for the base layer is scaled and used as an initial CU structure for the enhancement layer.

In HEVC, coding unit (CU) structure was introduced as a new block structure for coding process. A picture is divided into largest CUs (LCUs) and each LCU is adaptively partitioned into CUs until a leaf CU is obtained or a minimum CU size is reached. The CU structure information has to be conveyed to the decoder side so that the same CU structure can be recovered at the decoder side. In order to improve coding efficiency associated with the CU structure for a scalable HEVC, an embodiment according to the present invention allows the CU structure of the BL reused by the EL. In the EL LCU or CU level, one flag is transmitted to indicate whether the CU structure is reused from corresponding CU of the BL. If the BL CU structure is reused, the BL CU structure is scaled to match the resolutions of the EL and the scaled BL CU structure is reused by the EL. In some embodiments, the CU structure information that can be reused by the EL includes the CU split flag and residual quad-tree split flag. Moreover, the leaf CU of scaled CU structures can be further split into sub-CUs. FIG. 3 illustrates an example of CU partition reuse. Partition 310 corresponds to the CU structure of the BL. The video resolution of the EL is two times of the video resolution of the BL horizontally and vertically. The CU structure of corresponding CU partition 315 of BL is scaled up by 2. The scaled CU structure 320 is then used as the initial CU structure for the EL LCU. The leaf CUs of the scaled CU in the EL can be further split into sub-CUs and the result is indicated by 330 in FIG. 3. A flag may be used to indicate whether the leaf CU is further divided into sub-CUs. While FIG. 3 illustrates an example of CU structure is reused, other information may also be reused. For example, the prediction type, prediction size, merge index, inter reference direction, reference picture index, motion vectors, MVP index, and intra mode. The information/data can be scaled when needed before the information/data is reused in the EL, In another embodiment according to the present invention, the mode information for a leaf CU is reused. The mode information may include skip flag, prediction type, prediction size, inter reference direction, reference picture index, motion vectors, motion vector index, merge flag, merge index, skip mode, merge mode, and intra mode. The mode information of the leaf CU in the EL can share the same or scaled mode information of the corresponding CU in the BL. One flag can be used to indicate whether the EL will reuse the mode information from the BL or not. For one or more pieces of mode information, one flag can be used to indicate whether the EL will reuse this mode information from the BL or not. In yet another embodiment according to the present invention, the motion information of corresponding Prediction Unit (PU) or Coding Unit (CU) in the BL is reused to derive the motion information of a PU or CU in the EL. The motion information may include inter prediction direction, reference picture index, motion vectors (MVs), Motion Vector Predictors (MVPs), MVP index, merge index, merge candidates, and intra mode. The motion information for the BL can be utilized as predictors or candidates for the motion vector predictor (MVP) information in the EL. For example, the BL MVs and BL MVPs can be added into the MVP list and/or merge list for EL MVP derivation. The aforementioned MVs of BL can be the MVs of the corresponding PU in the BL, the MVs of neighboring PUs of the corresponding PUs in the BL, the MVs of merge candidates of the corresponding PUs in the BL, the MVP of the corresponding PUs in the BL, or the co-located MVs of the corresponding PUs in the BL.

In another example, the merge candidate derivation for the EL can utilize the motion information of the BL. For example, the merge candidates of a corresponding PU in the BL can be added into the merge candidate list and/or MVP list. The aforementioned motion information of the BL can be the motion information of the corresponding PU in the BL, the motion information associated with a neighboring PU of the corresponding PU in the BL, merge candidates of the corresponding PUs in the BL, MVP of the corresponding PUs in the BL, or the co-located PU of the corresponding PU in the BL. In this case, the motion information includes inter prediction direction, reference picture index, and motion vectors.

In yet another example, the intra mode of a corresponding PU or CU in the BL can be reused for the EL. For example, the ultra mode of a corresponding PU or CU in the BL can be added into the intra most probable mode list. An embodiment according to the present invention uses the motion information of the BL to predict the intra mode for the EL. The order for the most probable mode list in the EL can be adaptively changed according to the intra prediction mode information in the BL. Accordingly, the codeword lengths for codewords in the most probable mode list in the EL can be adaptively changed according to the intra prediction mode information in the BL. For example, the codewords of the intra remaining modes with prediction directions close to the prediction direction of coded BL intra mode are assigned a shorter length. As another example, the neighboring direction modes of BL intra mode can also be added into intra Most Probable Mode (MPM) list of the EL intra mode coding. The intra prediction mode information of the BL can be the intra prediction mode of the corresponding PU in the BL, or the neighboring direction modes of BL intra mode, or the intra prediction mode of a neighboring PU of the corresponding PU in the BL.

The selected MVP index, merge index, and intra mode index of BL motion information can be utilized to adaptively change the indices order in EL MVP list, merge index list, and intra most probable mode list. For example, in the HEVC Test Model Version 3.0 (HM-3.0), the order of the MVP list is {left MVP, above MVP, co-located MVP}. If the corresponding BL PU selects the above MVP, the order of the above MVP will be moved forward in the EL. Accordingly, the MVP list in the EL will become {above MVP, left MVP, co-located MVP}. Furthermore, the BL coded MV, scaled coded MV, MVP candidates, scaled MVP candidates, merge candidates, and scaled merge candidates can replace part of EL MVP candidates and/or merge candidates. The process of deriving the motion information for a PU or CU in the EL based on the motion information for a corresponding PU or CU in the BL is invoked when an MVP candidate or a merge candidate for a PU or CU in the EL is needed for encoding or decoding.

As mentioned earlier, the CU structure information for the BL can be used to determine the CU structure information for the EL. Furthermore, the CU structure information, the mode information and the motion information for the BL can be used jointly to determine the CU structure information, the mode information and the motion information for the EL. The mode information or the motion information for the BL may also be used to determine the mode information or the motion information for the EL. The process of deriving the CU structure information, the mode information, the motion information or any combination for the EL based on corresponding information for the BL can be invoked when the CU structure information, the mode information, the motion information or any combination for the EL needs to be encoded or decoded.

In HM-3.0, the prediction residual is further processed using quadtree partitioning and a coding type is selected for each block of results of residual quadtree partition. Both residual quadtree partition information and coding block pattern (CBP) information have to be incorporated into the bitstream so that the decoder can recover the residual quadtree information. An embodiment according to the present invention reuses the residual quadtree partition and CBP of a corresponding CU in the BL for the EL. The residual quadtree partition and CBP can be scaled and utilized as the predictor for the EL residual quadtree partition and CBP coding. In HEVC, the unit for block transform is termed as Transform Unit (TU) and a TU can be partitioned into smaller TUs. In an embodiment of the present invention, one flag for a root TU level or a TU level of the EL is transmitted to indicate that whether the Residual Quadtree Coding (RQT) structure of a corresponding TU in the BL is utilized to predict the RQT structure of the current TU in the EL. If the RQT structure of a corresponding TU in the BL is utilized to predict the RQT structure of the current TU in the EL, the RQT structure of the corresponding TU in the BL is scaled and used as the initial RQT structure of the current TU in the EL. In the leaf TU of the initial RQT structure for the EL, one split flag can be transmitted to indicate whether the TU is divided into sub-TUs. The process of deriving the RQT structure of the EL based on the information of the RQT structure of the BL is performed when an encoder needs to encode the RQT structure of the EL or a decoder needs to decode the RQT structure of the EL.

In H.264/AVC scalable extension, 4-tap and 2-tap FIR filters are adopted for the up-sampling operation of texture signal for luma and chroma components respectively. An embodiment according to the present invention re-samples the BL texture as the predictor of EL texture, where the re-sampling utilizes improved up-sampling methods to replace the 4-tap and 2-tap FIR filter in H.264/AVC scalable extension. The filter according to the present invention uses one of the following filters or a combination of the following filters: Discrete Cosine Transform Interpolation Filter (DCTIF), Discrete Sine Transform Interpolation Filter (DSTIF), Wiener filter, non-local mean filter, smoothing filter, and bilateral filter. The filter according to the present invention can cross TU boundaries or can be restricted within TU boundaries. An embodiment according to the present invention may skip the padding and deblocking procedures in inter-layer intra prediction to alleviate computation and data dependency problem. The Sample Adaptive Offset (SAO), Adaptive Loop Filter (ALF), non-local mean filter, and/or smoothing filter in the BL could also be skipped. The skipping of padding, deblocking, SAO, ALF, non-local mean filter, and smoothing filter can be applied to the entire LCU, leaf CU, PU, TU, pre-defined region, LCU boundary, leaf CU boundary, PU boundary, TU boundary, or boundary of a pre-defined region. In another embodiment, the texture of the BL is processed using a filter to produce filtered BL texture, and the BL texture has the same resolution as the EL texture and is used as the predictor of the texture of the EL.

Wiener filter, ALF (Adaptive Loop Filter), non-local mean filter, smoothing filter, or SAO (Sample Adaptive Offset) can be applied to the texture of the BL before the texture of BL is utilized as the predictor of the texture of the EL.

To improve picture quality, an embodiment of the present invention applies Wiener filter or adaptive filter to the texture of the BL before the texture of the BL is re-sampled. Alternatively, the Wiener filter or adaptive filter can be applied to the texture of the BL after the texture of the BL is re-sampled. Furthermore, an embodiment of the present invention applies SAO or ALF to the texture of the BL before the texture of the BL is re-sampled.

Another embodiment according to the present invention utilizes LCU-based or CU-based Wiener filter and/or adaptive offset for inter-layer intra prediction. The filtering can be applied to BL texture data or up-sampled BL texture data. In H.264 SVC, 2-tap FIR filter is adopted for the up-sampling operation of residual signal for both luma and chroma components. An embodiment according to the present invention uses improved up-sampling methods to replace the 2-tap FIR filter of H.264 SVC. The filter can be one of the following filters or a combination of the following filters: Discrete Cosine Transform Interpolation Filter (DCTIF), Discrete Sine Transform Interpolation Filter (DSTIF), Wiener filter, non-local mean filter, smoothing filter, and bilateral filter. When the EL has higher spatial resolution than the BL, the above filters can be applied to re-sample the BL residual. All the above filters can be restricted to cross or not to cross TU boundaries. Furthermore, the residual prediction can be performed in either the spatial domain or the frequency domain if the BL and the EL have the same resolution or the EL has a higher resolution than the BL. When the EL has higher spatial resolution than the BL, the residual of the BL can be re-sampled in frequency domain to form predictors for the EL residual. The process of deriving the predictor of residual of the EL by re-sampling the residual of the BL can be performed when an encoder or a decoder needs to derive the predictor of the residual of the EL based on the re-sampled residual of the BL.

An embodiment according to the present invention may utilize the BL information for context-based adaptive entropy coding in the EL. For example, the context formation or binarization of (Context-based Adaptive Binary Arithmetic Coding) CABAC can exploit the information of the BL. The EL can use different context models, different context formation methods, or different context sets based on corresponding information in the BL. For example, the EL PU can use different context models depending on whether the corresponding PU in the BL is coded in skip mode or not. In another embodiment of the present invention, the probability or most probable symbol (MPS) of part of context models for CABAC in the BL can be reused to derive the initial probability and MPS of part of context models for CABAC in the EL. The syntax element can be split flag, skip flag, merge flag, merge index, chroma intra mode, luma intra mode, partition size, prediction mode, inter prediction direction, motion vector difference, motion vector predictor index, reference index, delta quantization parameter, significant flag, last significant position, coefficient-greater-than-one, coefficient-magnitude-minus-one, ALF (Adaptive Loop Filter) control flag, ALF flag, ALF footprint size, ALF merge flag, ALF ON/OFF decision, ALF coefficient, sample adaptive offset (SAO) flag, SAO type, SAO offset, SAO merge flag, SAO run, SAO on/off decision, transform subdivision flags, residual quadtree CBF (Coded Block Flag), or residual quadtree root CBF. A codeword corresponding to the syntax elements can be adaptively changed according to the information of the BL and the codeword order corresponding to the syntax elements of the EL in a look-up codeword table can also be adaptively changed according to the information of the BL. The process of determining context information for processing the syntax element of the EL using the information of the BL is performed when the syntax element of the EL needs to be encoded or decoded.

An embodiment of the present invention uses some ALF information in the BL to derive the ALF information in the EL. The ALF information may include filter adaptation mode, filter coefficients, filter footprint, region partition, ON/OFF decision, enable flag, and merge results. For example, the EL can use part of ALF parameters in the BL as the ALF parameters or predictors of ALF parameters in the EL. When the ALF information is reused directly from the ALF information of the BL, there is no need to transmit the associated ALF parameters for the EL. A flag can be used to indicate whether the ALF information for the EL is predicted from the ALF information of the BL. If the flag indicates that the ALF information for the EL is predicted from the ALF information of the BL, the ALF information of the BL can be scaled and used as the predictor for the ALF information of the EL. A value can be used to denote the difference between the predictor of the ALF information and the ALF information of the EL. The process of deriving the ALF information for the EL using the ALF information of the BL is performed when an encoder or a decoder needs to derive the ALF information of the EL.

An embodiment of the present invention uses some SAO information in the BL to derive the SAO information in the EL. The SAO information may include offset type, offsets, region partition, ON/OFF decision, enable flag, and merge results. For example, the EL can use part of SAO parameters in the BL as the SAO parameters for the EL. When the SAO information is reused from the SAO information of the BL directly, there is no need to transmit the associated SAO parameters for the EL. A flag can be used to indicate whether the SAO information for the EL is predicted from the SAO information of the BL. If the flag indicates that the SAO information for the EL is predicted from the SAO information of the BL, the SAO information of the BL can be scaled and used as the predictor for the SAO information of the EL. A value can be used to denote the difference between the predictor of the SAO information and the SAO information of the EL. The process of deriving the SAO information for the EL using the SAO information of the BL is performed when an encoder or a decoder needs to derive the SAO information of the EL.

An embodiment of the present invention uses some Deblocking Filter (DF) information in the BL to derive the DF information in EL. The DF information may include threshold values, such as thresholds $\alpha$, $\beta$, and $t_c$ that are used to determine Boundary Strength (BS). The DF information may also include filter parameters, ON/OFF filter decision, Strong/Weak filter selection, or filter strength. When the DF information is reused from DF information of the BL directly, there is no need to transmit the associated DF parameters for the EL. A flag can be used to indicate whether the DF information for the EL is predicted from the DF information of the BL. If the flag indicates that the DF information for the EL is predicted from the DF information of the BL, the DF information of the BL can be scaled and used as the predictor for the DF information of the EL. A value can be used to denote the difference between the predictor of the DF information and the DF information of the EL. The process of deriving the DF information for the EL using the DF information of the BL is performed when an encoder or a decoder needs to derive the DF information of the EL.

Figure 4:
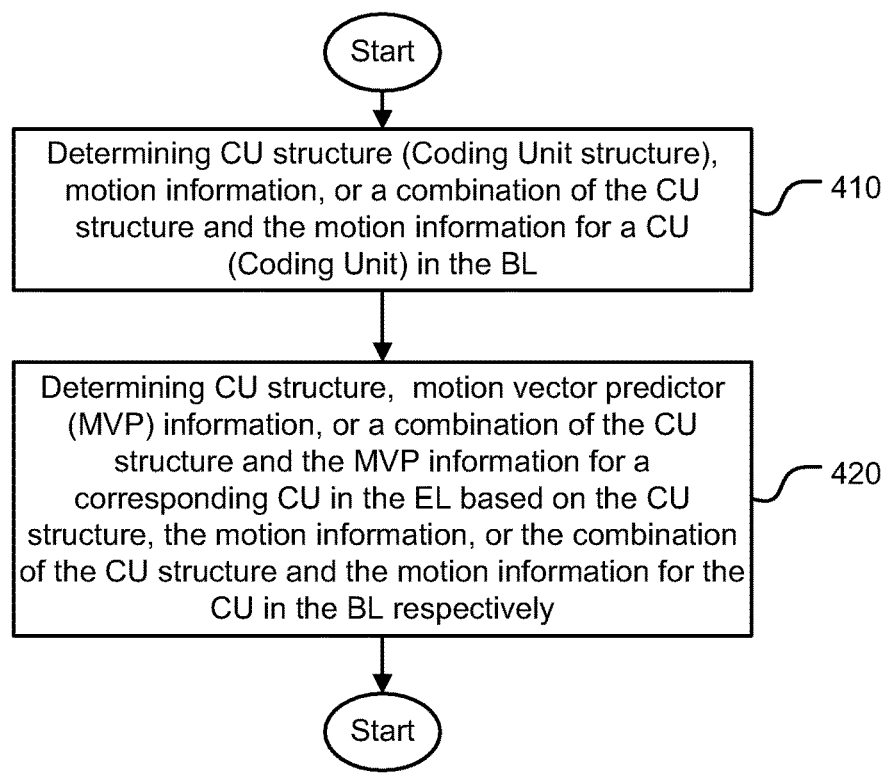
FIG. 4 illustrates an exemplary flow chart of CU structure coding or motion information coding for scalable video coding according to an embodiment of the present invention.
Figure 5:
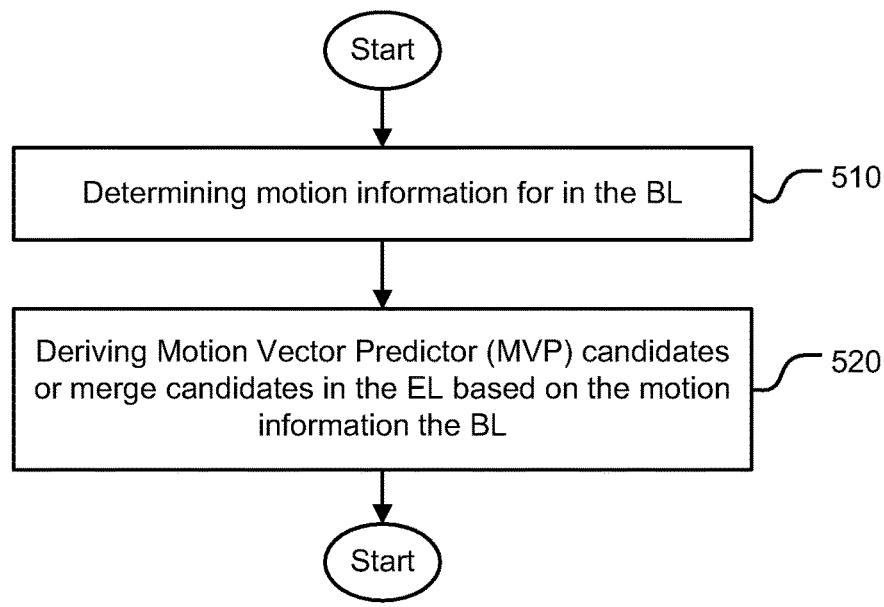
FIG. 5 illustrates an exemplary flow chart of MVP derivation or merge candidate derivation for scalable video coding according to an embodiment of the present invention.
Figure 6:
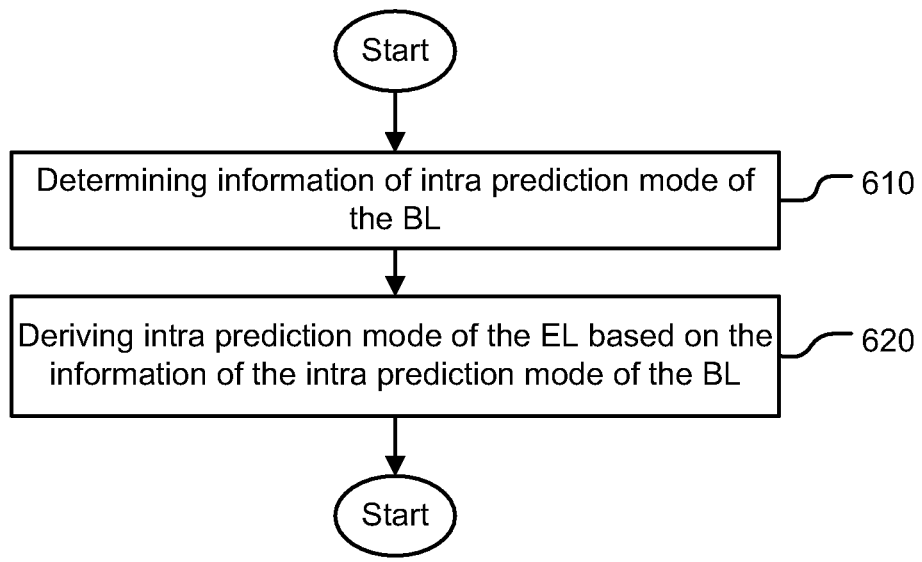
FIG. 6 illustrates an exemplary flow chart of intra prediction mode derivation for scalable video coding according to an embodiment of the present invention.

FIGS. 4 through 11 illustrate exemplary flow charts for scalable video coding according to various embodiments of the present invention. FIG. 4 illustrates an exemplary flow chart of CU structure coding or motion information coding for scalable video coding according to an embodiment of the present invention, wherein video data is configured into a Base Layer (BL) and an Enhancement Layer (EL) and wherein the EL has higher spatial resolution or better video quality than the BL. The CU structure (Coding Unit structure), motion information, or a combination of the CU structure and the motion information for a CU (Coding Unit) in the BL is determined in step 410. The CU structure, motion vector predictor (MVP) information, or a combination of the CU structure and the MVP information for a corresponding CU in the EL based on the CU structure, the motion information, or the combination of the CU structure and the motion information for the CU in the BL is respectively determined in step 420. FIG. 5 illustrates an exemplary flow chart of MVP derivation or merge candidate derivation for scalable video coding according to an embodiment of the present invention, wherein video data is configured into a Base Layer (BL) and an Enhancement Layer (EL) and wherein the EL has higher spatial resolution or better video quality than the BL. The motion information for the BL is determined in step 510. The Motion Vector Predictor (MVP) candidates or merge candidates in the EL based on the motion information of the BL is derived in step 520. FIG. 6 illustrates an exemplary flow chart of intra prediction mode derivation for scalable video coding according to an embodiment of the present invention, wherein video data is configured into a Base Layer (BL) and an Enhancement Layer (EL) and wherein the EL has higher spatial resolution or better video quality than the BL. The information of intra prediction mode of the BL is determined in step 610. The intra prediction mode of the EL based on the information of the intra prediction mode of the BL is derived in step 620.

Figure 7:
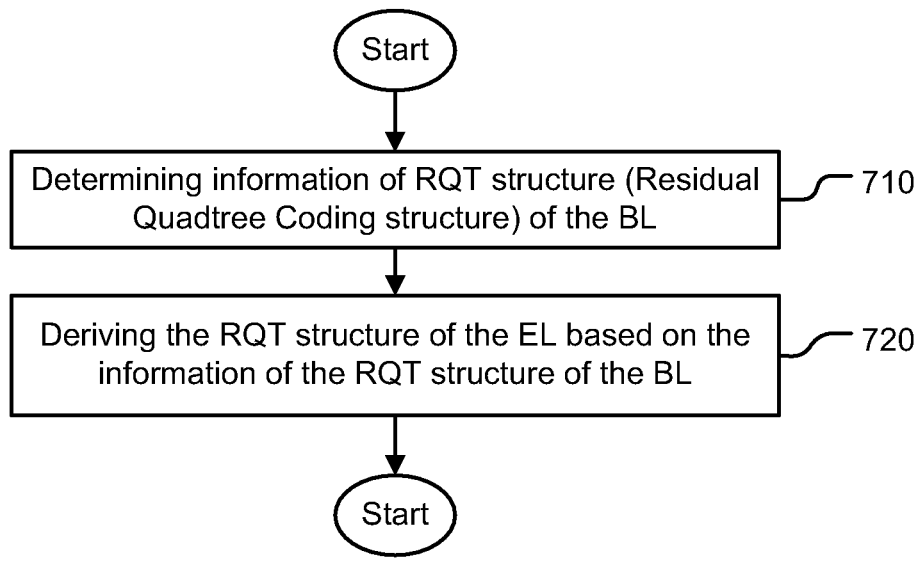
FIG. 7 illustrates an exemplary flow chart of Residual Quadtree Structure coding for scalable video coding according to an embodiment of the present invention.
Figure 8:
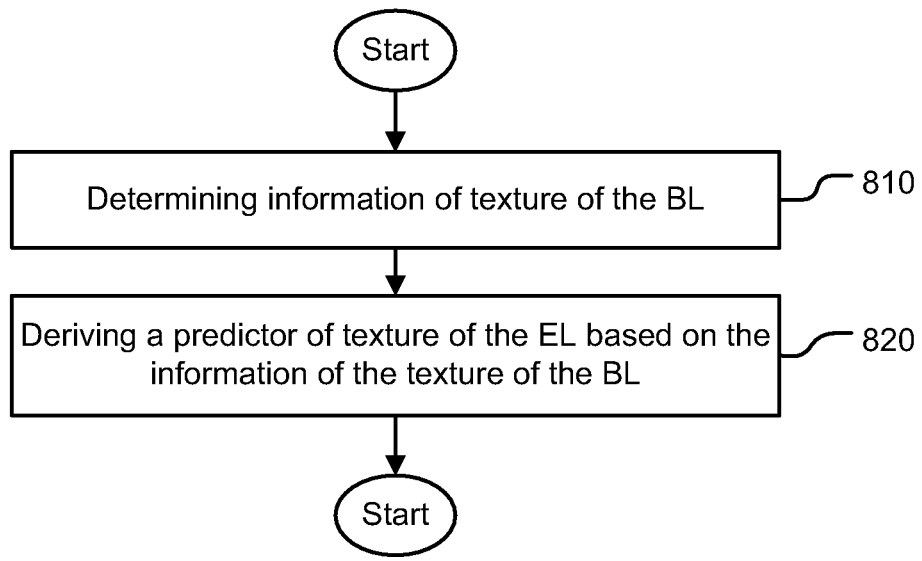
FIG. 8 illustrates an exemplary flow chart of texture prediction and re-sampling for scalable video coding according to an embodiment of the present invention.
Figure 9:
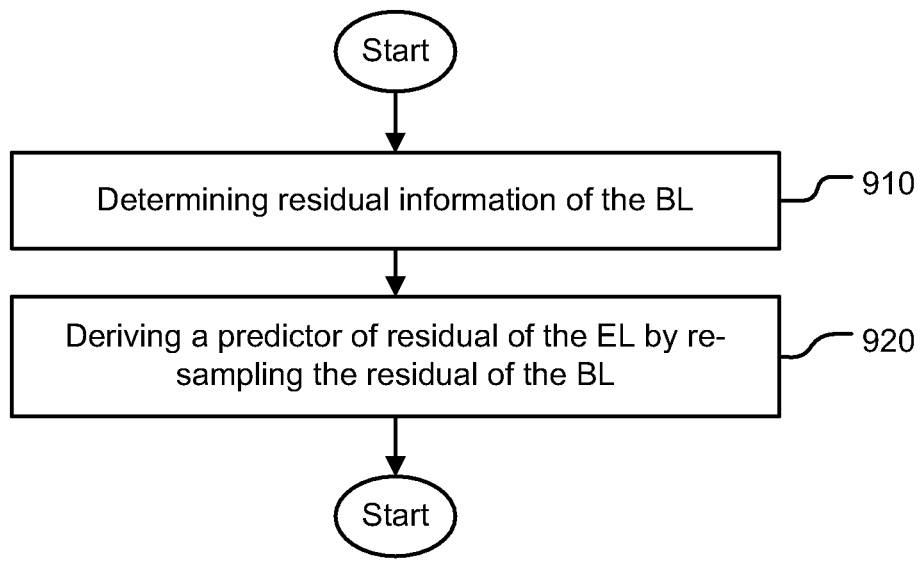
FIG. 9 illustrates an exemplary flow chart of residual prediction and re-sampling for scalable video coding according to an embodiment of the present invention.

FIG. 7 illustrates an exemplary flow chart of Residual Quadtree Structure coding for scalable video coding according to an embodiment of the present invention, wherein video data is configured into a Base Layer (BL) and an Enhancement Layer (EL) and wherein the EL has higher spatial resolution or better video quality than the BL. The information of RQT structure (Residual Quadtree Coding structure) of the BL is determined in step 710. The RQT structure of the EL based on the information of the RQT structure of the BL is derived in step 720. FIG. 8 illustrates an exemplary flow chart of texture prediction and re-sampling for scalable video coding according to an embodiment of the present invention, wherein video data is configured into a Base Layer (BL) and an Enhancement Layer (EL) and wherein the EL has higher spatial resolution than the BL or better video quality than the BL. The information of texture of the BL is determined in step 810. A predictor of texture of the EL based on the information of the texture of the BL is derived in step 820. FIG. 9 illustrates an exemplary flow chart of residual prediction and re-sampling for scalable video coding according to an embodiment of the present invention, wherein video data is configured into a Base Layer (BL) and an Enhancement Layer (EL) and wherein the EL has higher spatial resolution than the BL or better video quality than the BL. The residual information of the BL is determined in step 910. A predictor of residual of the EL by re-sampling the residual of the BL is derived in step 920.

Figure 10:
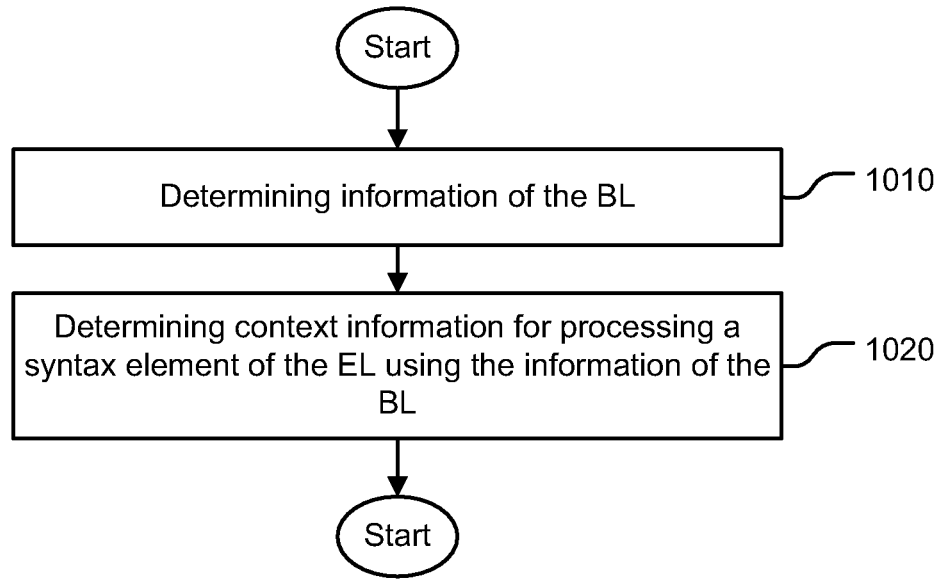
FIG. 10 illustrates an exemplary flow chart of context adaptive entropy coding for scalable video coding according to an embodiment of the present invention.
Figure 11:
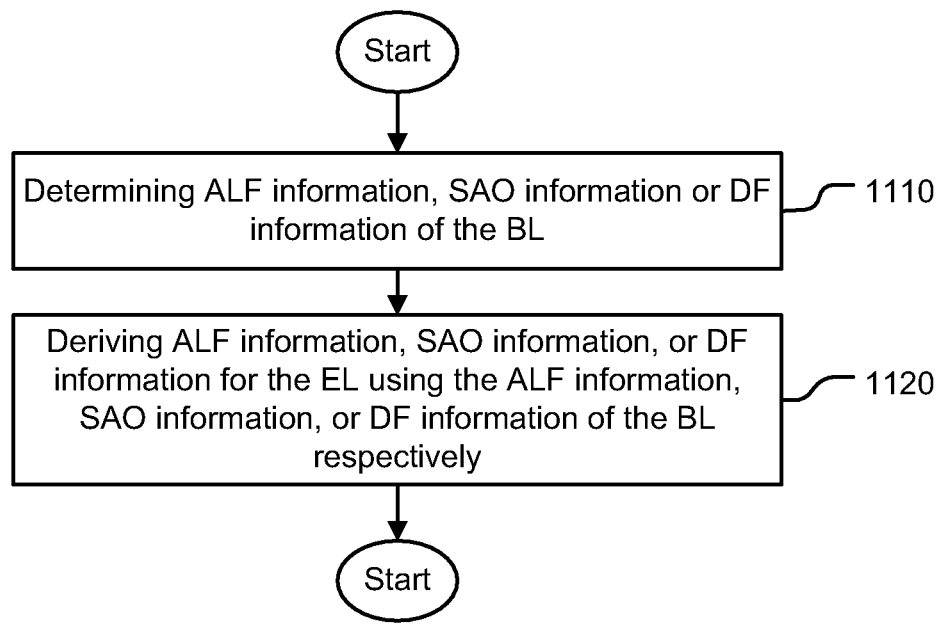
FIG. 11 illustrates an exemplary flow chart of ALF information coding, SAO information coding and DF information coding for scalable video coding according to an embodiment of the present invention.

FIG. 10 illustrates an exemplary flow chart of context adaptive entropy coding for scalable video coding according to an embodiment of the present invention, wherein video data is configured into a Base Layer (BL) and an Enhancement Layer (EL) and wherein the EL has higher spatial resolution or better video quality than the BL. The information of the BL is determined in step 1010. The context information for processing a syntax element of the EL using the information of the BL is determined in step 1020. FIG. 11 illustrates an exemplary flow chart of ALF information coding, SAO information coding and DF information coding for scalable video coding according to an embodiment of the present invention, wherein video data is configured into a Base Layer (BL) and an Enhancement Layer (EL) and wherein the EL has higher spatial resolution or better video quality than the BL. The ALF information, SAO information or DF information of the BL is determined in step 1110. The ALF information, SAO information, or DF information for the EL using the ALF information, SAO information, or DF information of the BL is respectively derived in step 1120.

Embodiments of scalable video coding, where the enhancement layer coding exploits the information of the base layer, according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of Motion Vector Predictor (MVP) derivation or merge candidate derivation for scalable video coding, wherein video data is configured into a Base Layer (BL) and an Enhancement Layer (EL) and wherein the EL has higher spatial resolution or better video quality than the BL, the method comprising:
identifying motion information for a BL block that corresponds to a current EL block;
constructing a candidate list for the current EL block by including MVP candidates or merge candidates for the current EL block and replacing a candidate thereof with a motion vector derived from the motion information for the BL block; and encoding or decoding the current EL block based on the candidate list, wherein an index associated with a selected EL candidate in the candidate list is incorporated in a bitstream at an encoder side or derived from the bitstream at a decoder side.

2. The method of claim 1, wherein the constructing the candidate list for the current EL block is performed when encoding or decoding of the video data needs to derive the MVP candidates or the merge candidates for the current EL block.

3. The method of claim 1, wherein the motion vector derived from the motion information for the BL block replaces a candidate of the MVP candidates for the current EL block.

4. The method of claim 3, wherein the motion information for the BL block comprises a motion vector of a corresponding Prediction Unit (PU) in the BL, a motion vector of a neighboring PU of the corresponding PU in the BL, a motion vector of a merge candidate of the corresponding PU in the BL, an MVP of the corresponding PU in the BL, or a co-located motion vector of the corresponding PU in the BL.

5. The method of claim 3, wherein a motion vector for the BL is scaled up as the motion vector derived from the motion information for the BL block according to a video resolution ratio between the current EL block to the BL block.

6. The method of claim 1, wherein the motion information for the BL block comprises a motion vector of a corresponding Prediction Unit (PU) in the BL, a motion vector of a neighboring PU of the corresponding PU in the BL, a motion vector of a merge candidate of the corresponding PU in the BL, an MVP of the corresponding PU in the BL, or a co-located motion vector of the corresponding PU in the BL.

7. The method of claim 1, wherein a motion vector for the BL is scaled up as the motion vector derived from the motion information for the BL block according to a video resolution ratio between the current EL block to the BL block.

8. An apparatus of Motion Vector Predictor (MVP) derivation or merge candidate derivation for scalable video coding, wherein video data is configured into a Base Layer (BL) and an Enhancement Layer (EL) and wherein the EL has higher spatial resolution or better video quality than the BL, the apparatus comprising:

at least one circuit configured for:

identifying motion information for a BL block that corresponds to a current EL block:

constructing a candidate list for the current EL block by including MVP candidates or merge candidates for the current EL block and replacing a candidate thereof with a motion vector derived from the motion information for the BL block; and encoding or decoding the current EL block based on the candidate list, wherein an index associated with a selected EL candidate in the candidate list is incorporated in a bitstream at an encoder side or derived from the bitstream at a decoder side.

* * * * *